United States Patent [19]
Mallak

[11] Patent Number: 5,180,134
[45] Date of Patent: Jan. 19, 1993

[54] UNIT LOAD CARRIER AND METHOD FOR MANIPULATING A UNIT LOAD

[75] Inventor: Joseph F. Mallak, 5306 West Patterson, Chicago, Ill. 60641

[73] Assignee: Joseph F. Mallak, Chicago, Ill.

[21] Appl. No.: 442,496

[22] Filed: Nov. 27, 1989

Related U.S. Application Data

[63] Continuation of Ser. No. 9,212, Jan. 30, 1987, abandoned.

[51] Int. Cl.⁵ .............................................. B60P 7/00
[52] U.S. Cl. .................................. 248/544; 248/346; 108/55.1
[58] Field of Search .................................. 254/93 HP

[56] References Cited

FOREIGN PATENT DOCUMENTS 2302248 7/1974 Fed. Rep. of Germany ...... 182/137
2405788 8/1975 Fed. Rep. of Germany ... 254/93 HP Primary Examiner—Alvin C. Chin-Shue
Attorney, Agent, or Firm—Leydig, Voit and Mayer

[57] ABSTRACT

The disclosure describes a unit load carrier which comprises a support for supporting at least a portion of the weight of the unit load, a fluid cell cooperatively arranged adjacent to the support and including a collapsible wall, and a mechanism for controlling the rate at which fluid is released from the fluid cell. In one exemplary embodiment, the support comprises a resilient cushion including a first side having a surface for supporting the portion of the weight of the unit load, an oppositely-facing second side, and an edge extending between the first and second sides; the fluid cell comprises a generally pillow-shaped air cell mounted to the edge of the support adjacent to the surface; and the controlling mechanism comprises an orifice disposed in the air cell and sized to limit the rate at which air is released from the cell.

22 Claims, 2 Drawing Sheets

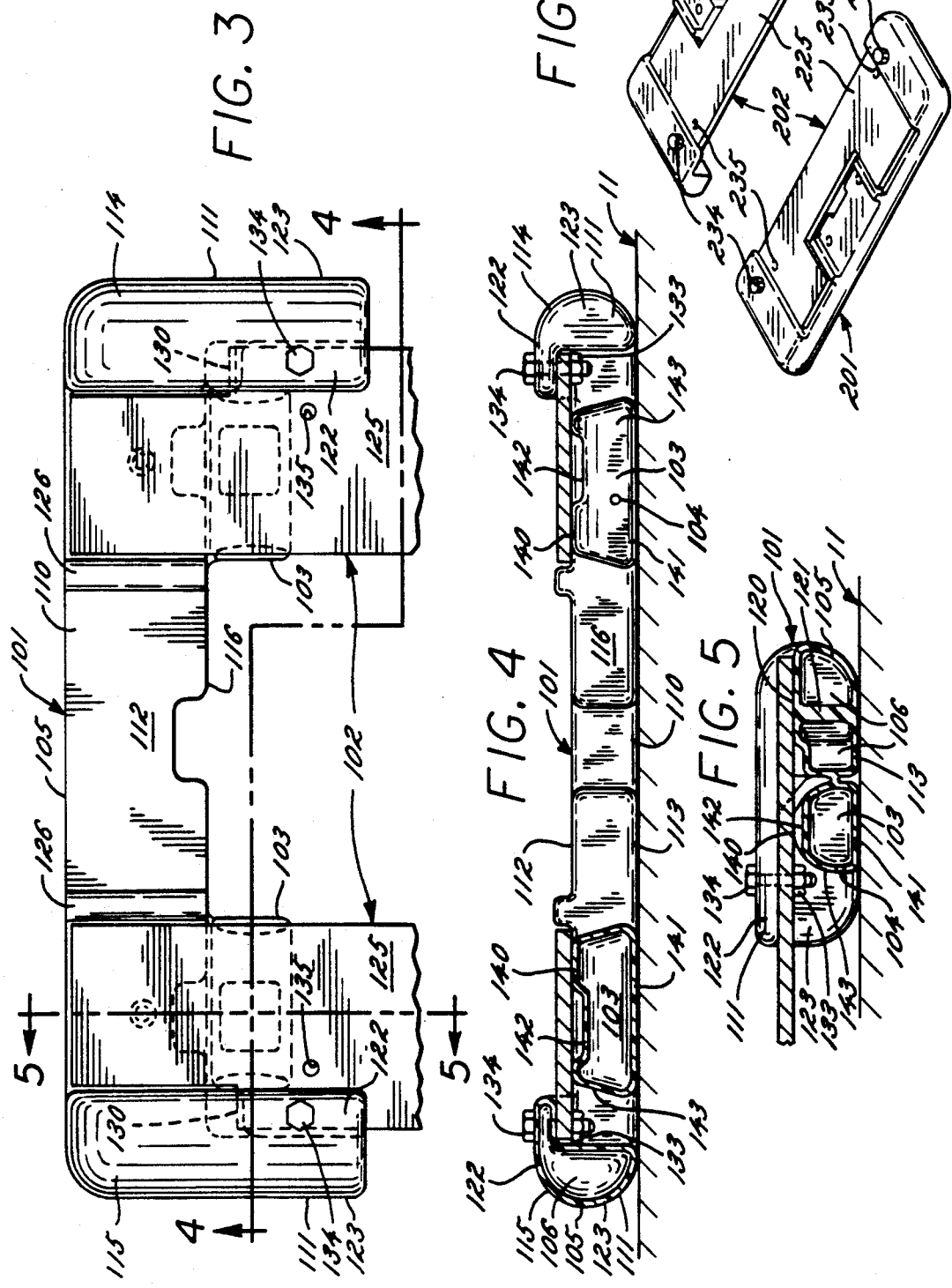

UNIT LOAD CARRIER AND METHOD FOR MANIPULATING A UNIT LOAD

This application is a continuation of application Ser. No. 009,212, filed Jan. 30, 1987, abandoned.

FIELD OF THE INVENTION

The present invention relates to the manipulation of a unit load and, in particular, to the shipping, positioning, and lowering of a unit load.

BACKGROUND OF THE INVENTION

A "unit load" may be defined as a single item, e.g., a piece of equipment, such as an offset duplicating machine, or a collection or items, e.g., a rack of glass panes, that is to be moved from one location to another. Frequently, the unit load is both heavy and fragile.

Manipulating a unit load, e.g., the piece of equipment, may include shipping the equipment to a particular destination, positioning it in a desired location, and lowering it to a foundation surface, such as the ground, a floor, a platform, or the like. Considerable care is required to avoid damage to either the equipment or the people manipulating the equipment. A blow to the equipment can cause structural damage or upset delicate factory settings. Dropping the equipment may not only similarly damage the equipment but may also endanger people close to the equipment.

Conventional devices for manipulating a unit load have several drawbacks. For example, U.S. Pat. No. 4,079,907 discloses a cushioned shipping support which includes a bumper-skid having a wedge-shaped portion. Similarly, U.S. Pat. No. 3,602,376 discloses a self-unloading skid having corner feet with an inclined slip plane. In each of these conventional devices, the unit load is shipped while resting on the skid and then lowered into position by sliding the unit load down the incline of the skid.

However, the rate at which the unit load slides off the skid is frequently not accurately predictable because it depends on a number of inter-related factors including the angle of the incline, the amount of friction between the skid and the equipment, and the weight of the unit load. For example, if the skid becomes wet during shipping, the unit load may slide down the incline at an excessive rate because the friction between the skid and the unit load may be greatly reduced if the incline is wet.

SUMMARY OF THE INVENTION

The invention provides an improved unit load carrier and an improved method for manipulating a unit load which allow the unit load to be gently and safely lowered onto a foundation surface at a controlled rate.

In accordance with one aspect of the invention, a unit load carrier may comprise a support for supporting at least a portion of the weight of the unit load and a fluid cell arranged adjacent to the support. The cell has collapsible walls and contains a fluid, preferably a gas. The carrier further comprises a mechanism for controlling the rate at which the fluid is released from the cell.

With the weight of the unit load bearing on the support, the unit load may be positioned in a desired location. The weight of the unit load may then be transferred from the support onto the adjacent fluid cell, forcing the fluid from the cell. As the fluid is released, the walls of the cell collapse, lowering the unit load onto the foundation surface. However, the control mechanism limits the rate at which the fluid is released and, therefore, the rate at which the cell collapses, allowing the unit load to be lowered at a controlled rate.

In accordance with another aspect of the invention, a unit load carrier may comprise two resilient cushions, a base arrangement, collapsible fluid cells, and a mechanism for controlling the rate at which fluid is released from the cells. The resilient cushions, each of which has upper and lower sides and an edge extending between the sides, are arranged with the edge of one cushion facing the edge of the other cushion. The base arrangement is releasably mounted to the cushions and supports the unit load on the cushions. The collapsible fluid cells are mounted to the edge of each resilient cushion.

With the unit load mounted on the base arrangement and the base arrangement mounted on the resilient cushions, the unit load then may be shipped to a particular destination and positioned in a desired location. The resilient cushions absorb the shock of any blows to the unit load during shipping or positioning. Once the unit load is in position, the base arrangement is released from the resilient cushions and transferred from the resilient cushions onto the adjacent collapsible fluid cells, forcing the fluid from the cells. Again, the control mechanism limits the rate at which the fluid is released from the cells and, therefore, the rate at which the cells collapse, allowing the unit load to be lowered to the foundation surface at a suitable rate. After the cell has collapsed under the weight of the unit load, the supports and base arrangement may be removed from under the unit load.

Thus, in accordance with a further aspect of the invention, a method for manipulating a unit load may comprise the steps of positioning the unit load on a foundation surface with a support disposed between the unit load and the foundation surface, transferring the weight of the unit load from the support onto a collapsible fluid cell, and controlling the rate at which fluid is released from the collapsible cell to control the rate at which the unit load is lowered to the foundation surface.

In one exemplary embodiment, the fluid cell comprises a cell containing air and the controlling mechanism comprises an orifice in the cell. The orifice is sized to limit the rate at which air is released from the cell. For example, the orifice may comprise a small hole which only allows the air to be released slowly even with a heavy unit load resting on the cell. As the air slowly escapes from the cell, the cell slowly collapses and gently lowers the unit load onto the foundation surface.

The present invention not only allows the unit load to be gently lowered into position and, therefore, prevents damage to the unit load, but it also reduces the risk of injury to workers manipulating the unit load. It is the collapsing cell, not the workers, which bears the weight of the unit load as it is being lowered onto the foundation surface. Further, since the cell collapses slowly, the workers do not need to independently support the weight of the unit load and have ample time to ensure that their hands and feet are not under the slowly descending unit load. Consequently, the risk of muscle or back strain and the risk of injury to hands and feet are greatly reduced.

BRIEF DESCRIPTION OF THE DRAWINGS

In the accompanying drawings:

FIG. 3 is a plan view of a portion of the first exemplary unit load carrier of FIG. 1;

FIG. 4 is a sectional elevation view of the first exemplary unit load carrier as viewed along line 4—4 of FIG. 3;

FIG. 5 is a sectional elevation view of the first exemplary unit load carrier as viewed along line 5—5 of FIG. 3; and FIG. 6 is a perspective view of a second exemplary unit load carrier embodying the present invention.

DETAILED DESCRIPTION OF EXEMPLARY EMBODIMENTS

Figure 1:
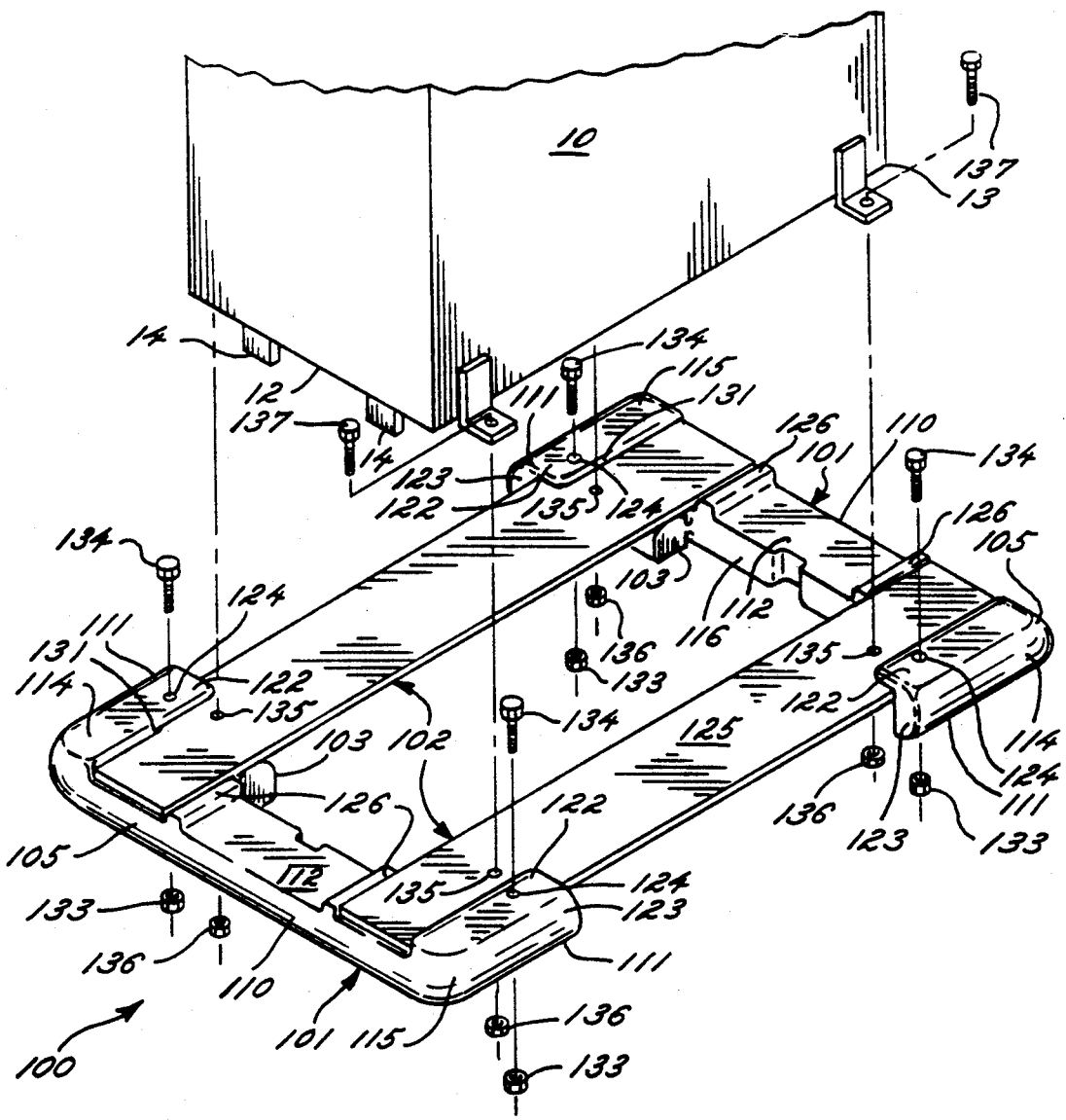
FIG. 1 is an exploded perspective view of a first exemplary unit load carrier embodying the invention.
Figure 2:
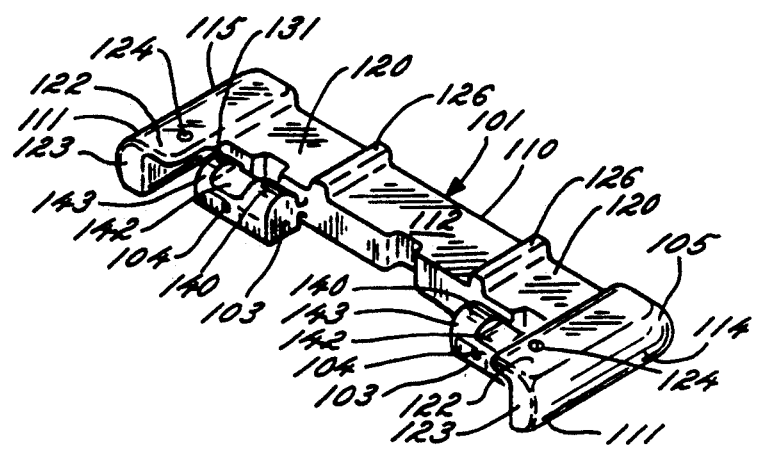
FIG. 2 is a perspective view of the support and the fluid cells of the first exemplary unit load carrier of FIG. 1.

As shown in FIG. 1, a first exemplary unit load carrier 100 embodying the invention generally comprises two supports 101 releasably mounted to a base arrangement 102 which, in turn, supports a unit load, such as a piece of equipment 10, on the supports 101. In accordance with one aspect of the invention, the first exemplary unit load carrier 100 further comprises collapsible fluid cells 103 arranged adjacent to each support 101 and a fluid control mechanism 104 for controlling the rate at which fluid is released from the collapsible cells 103. The supports 101 serve to protect the equipment 10, for example, during shipping and positioning, while the collapsible cells 103 and the fluid control mechanism 104 allow the equipment 10 to be lowered onto a foundation surface 11, such as the ground or a floor.

The supports 101 of the first exemplary unit load carrier 100 are intended to support identical, opposite edges 12, 13 of a relatively fragile but heavy piece of equipment 10, e.g., an offset duplicating machine. Accordingly, the supports 101 are identical and are preferably constructed as resilient cushions. For other unit loads, such as those not having identical edges or those which are less fragile, the supports 101 need not be identical and may alternatively comprise any suitable construction, including a simple platform fashioned from wood, metal, or a thermoplastic material.

Each resilient cushion may have any suitable construction. For example, it may be fashioned from a solid piece of resilient material, such as rubber. As shown in FIGS. 2-5, in the first exemplary unit load carrier 100, the resilient cushion is preferably fashioned as a hollow shell 105 from a thermoplastic material, e.g., by blow-molding a low-density, linear polyethylene. The hollow shell 105 defines an enclosed, generally air-tight cavity 106. Together, the hollow shell 105 and enclosed cavity 106 provide a cushioning effect which resiliently absorbs shock without significant permanent deformation.

The hollow shell 105 is preferably configured with an elongated body 110 and opposing brackets 111. The body 110 may include upper and lower sides 112, 113 and opposite ends 114, 115 and an inside edge 116 which extend between the upper and lower sides 112, 113. The upper side 112 may include separated surfaces 120 for supporting the weight of the equipment 10. To provide additional structural support, the body 110 may also include one or more braces 121 disposed within the shell 105 and extending between the upper and lower sides 112, 113 near the supporting surfaces 120. To stably support the equipment 10, the lower side 113 may be flat, as shown in FIGS. 4 and 5, or may include several feet.

The brackets 111 are mounted to the ends 114, 115 of the body 110 and extend beyond the edge 116. In the first exemplary unit load carrier 100, the brackets are integrally formed with the body 110. The brackets 111 preferably have a generally L-shaped cross-section with one arm 122 extending parallel to the upper side 112 of the body 110 and the other arm 123 extending toward the lower side 113 of the body 110. The parallel arm 122 may include at least one opening 124 for mounting the base arrangement 102 to the support 101.

The base arrangement 102 of the first exemplary unit load carrier 100 comprises two runners 125 which extend between a supporting surface 120 on one support 101 and a supporting surface 120 on the other support 101, the edges 116 of the supports 101 facing each other. Raised ends 114, 115 and raised ribs 126 on the upper side 112 of each support 101 serve to position the ends of the runners 125 on the supporting surfaces 120. Further, a notch 130 at each end of the runner 125 cooperates with a stop 131 on each support 101 to limit the travel of the runners 125 along the supporting surfaces 120. One set of openings 132 in the runners 125 are aligned with the openings 124 in the arms 122 of the brackets 111 when the runners 125 are properly positioned on the supports 101. Releasable connectors, such as nuts 133 and bolts 134, may be used to releasably mount the base arrangement 102 to the supports 101. The equipment 10, in turn, may be releasably mounted to the base arrangement 102 by means of a second set of openings 135 and releasable connectors, such as nuts 136 and bolts 137, with the feet 14 of the equipment 10 hanging below the base arrangement 102.

Various alternatives to the base arrangement 102 of the first exemplary unit load carrier 100 may be suitable. For example, as shown in FIG. 6, a second exemplary unit load carrier 200, which is identical to the first exemplary unit load carrier 100 except for the base arrangement 202, includes a base arrangement 202 having runners 225 which do not extend from one support 201 to another. While the runners 225 are releasably mounted to the equipment (not shown), again by means of a second set of openings 235 and releasable connectors (not shown), each runner 225 is mounted to a single support 201 by means of a first set of openings (not shown) and releasable connectors 233, 234.

Further, some equipment may be suitable for mounting directly to the supports. The base arrangement may then be entirely eliminated.

The first exemplary unit load carrier 100 further comprises two fluid cells 103, each spaced from the support 101 but formed integrally with the edge 116 of the support 101 adjacent to a supporting surface 120. Alternatively, a single fluid cell extending adjacent to both supporting surfaces could be mounted to the edge, or the cells could be fixedly mounted to the edge by a connector or by an adhesive. The cells could also be removably mounted to the support. Removably mounting the cells to the support would allow the support to be reused since collapsed cells could be replaced by new cells. Further, the cells could even be incorporated in the body of the support if the weight of the equipment rested on the support during shipping or positioning and the cells remained free to be selectively collapsed under the weight of the equipment.

Each fluid cell 103 preferably has an elongate pillow-shaped configuration, is mounted generally parallel to the body 110 of the 101, and includes upper and lower sides 140, 141 which respectively lie generally in the planes of the upper and lower sides 112, 113 of the support 101. Some pieces of equipment have a support pedestal (not shown) so the upper side 140 of each cell 103 may include a depression 142 for receiving the support pedestal. Each fluid cell 103 further includes a collapsible wall 143 which extends between the upper and lower sides 140, 141. Together, the upper and lower sides 140, 141 and the collapsible wall 143 define an impervious container for the fluid. The fluid cells 103 of the first exemplary unit load carrier 100 preferably contain a gas, such as air, and the air cell is preferably isolated from the air-tight cavity 106 of the support 101.

The mechanism 104 for controlling the rate at which fluid is released from the cell 103 also may be variously configured. For example, it could comprise a manually actuated valve assembly interconnecting one or both cells to ambient pressure. In the first exemplary unit load carrier 100, the fluid controlling mechanism 104 comprises an orifice sized to limit the rate at which air is released from the cell 103. The size of the orifice 104 may be determined empirically or in accordance with standard engineering principles for any given fluid, material of construction, cell volume, equipment weight, and desired length of time for collapse. The orifice 104 is preferably disposed, in the collapsible wall 143 near the lower side 141 of the cell 103 to minimize the risk that the orifice 104 will become blocked as the cell 103 collapses.

In accordance with another aspect of the invention, an exemplary method for manipulating a unit load, e.g., a piece of equipment, generally comprises positioning the equipment on a support resting on a foundation surface 11, such as the ground or a floor, transferring the weight of the equipment from the support onto a collapsible fluid cell, and controlling the rate at which the fluid is released from the cell to control the rate at which the equipment is lowered to the foundation surface 11.

For example, the base arrangement 102 of the first exemplary unit load carrier 100 may be mounted to the supports 101 while the equipment 10 may be mounted to the base arrangement 102. The equipment 10 along with the first exemplary unit load carrier 100 may then be shipped to any particular location and positioned in a desired location with the first exemplary unit load carrier 100 resting on the foundation surface 11.

Thus, during shipping and positioning, the support surfaces 120 of the supports 101 bear the weight of the equipment 10. Further, the supports 101 are dimensioned to extend beyond the sides of the equipment 10 and below the bottom of the equipment 10. Consequently, any jarring or blows from adjacent items will be absorbed and dissipated by the resilient cushion, preventing damage during shipping and positioning of the equipment.

Once the equipment has been positioned, the removable connectors 133, 134 mounting the base arrangement 102 to the supports 101 may be removed. The ends of the runners 125 are then slid off the supporting surfaces 120 of one of the supports 101 and onto the pair of collapsible fluid cells 103 adjacent to the support 101, for example, by sliding the support 101 relative to the base arrangement 102 and the foundation surface 11. This transfers the weight of the equipment 10 from the support 101 to the collapsible fluid cells 103. The weight of equipment 10 forces the air from the fluid cells 103 through the orifice 104, resulting in a controlled lowering of the feet 14 on one edge 12 of the equipment 10 to the foundation surface 11. The other ends of the runners 125 are then slid off the supporting surfaces 120 of the other support 101 and onto the collapsible cells 103. Again, the weight of the equipment 10 forces the air from the fluid cells 103 through the orifice 104, resulting in a controlled lowering of the feet 14 on the other edge 13 of the equipment 10 to the foundation surface 11. With the feet 14 of the equipment 10 resting on the foundation surface 11, there is sufficient space between the foundation surface 11 and the bottom of the equipment 10 to allow the collapsed cells 103 to be pulled from underneath the edges 12, 13 of the equipment 10. The base arrangement 102 is then removed from the equipment 10 by means of the releasable connectors 136, 137.

The orifices 104 may be sized to provide a suitable length of time for collapse. For example, it has been predicted that a machine weighing approximately 860 pounds could be lowered about three inches to the floor in approximately five seconds by four air cells, each cell having a volume of approximately thirty-five cubic inches, a linear polyethylene wall with a thickness of approximately three/thirty-seconds of an inch, and an orifice one/eighth of an inch in diameter.

While the invention has been described in terms of several embodiments, it is not limited to those embodiments. Alternative embodiments and modifications which would still be encompassed by the invention may be made by those skilled in the art, particularly in light of the foregoing teachings. Therefore, the following claims are intended to cover any alternative embodiments, modifications, or equivalents which may be included within the spirit and scope of the invention.

I claim:

1. A unit load carrier comprising a base, support means located below said base for supporting at least a portion of the weight of the unit load, mounting means for releasably mounting said support means to said base at least one collapsible fluid cell located below said base, said fluid cell being collapsible under at least a portion of the weight of the unit load and in a direction perpendicular to a foundation surface, and control means for controlling the rate at which fluid is released from the cell, said support means, when mounted to said base, being in weight-bearing relationship to the base and unit load, said fluid cell being integral with said support means and not being in weight-bearing relationship to the base and unit load when the support means is mounted to the base, said fluid cell being collapsible so that upon release of said support means from weight-bearing relationship to said unit load a sufficient portion of the weight of said unit load is received by said fluid cell causing the control means to controllably release fluid from the fluid cell and said fluid cell to collapse sufficiently to lower said unit load to the foundation surface; said collapsed fluid cell being removable from underneath said unit load when said load is at rest on the foundation surface.

2. The unit load carrier of claim 1 wherein the support comprises a resilient cushion including a first side having a surface for supporting the portion of the weight of the unit load, an oppositely-facing second side, first and second ends and an edge extending between the first and second sides, and a generally L-shaped bracket extending from each end beyond the edge, wherein the fluid cell comprises a generally pillow-shaped air cell mounted to the edge of the support adjacent to the supporting surface, and wherein the controlling means includes an orifice in the air cell which is sized to limit the rate at which air is released from the cell.

3. The unit load carrier of claim 1 wherein the resilient cushion comprises a hollow shell defining an air cavity and having at least one brace disposed within the shell and extending between the first and second sides, wherein the air cell is integrally formed with the edge of the resilient cushion, and wherein the unit load carrier comprises a molded thermoplastic material.

4. The unit load carrier of claim 1 wherein the thermoplastic material comprises polyethylene.

5. The unit load carrier of claim 2 wherein the first side of the support includes first and second supporting surfaces for supporting the portion of the weight of the unit load and wherein the carrier comprises first and second air cells mounted to the edge of the support adjacent to the first and second supporting surfaces, respectively.

6. The carrier of claim 1 wherein the support includes a resilient cushion.

7. The carrier of claim 6 wherein the resilient cushion includes a hollow shell defining an air cavity and having first and second sides and further includes a brace disposed within the shell and extending between the first and second sides.

8. The carrier of claim 1 wherein the support has first and second sides, the first side having a surface for supporting the weight of the unit load.

9. The carrier of claim 8 wherein the support further includes first and second ends disposed between the first and second sides and a bracket extending from each end, each bracket having a generally L-shaped cross-section including one arm which is parallel to the first side.

10. The carrier of claim 8 wherein the support further has an edge extending between the first and second sides and wherein the fluid cell is mounted to the edge of the support adjacent to the supporting surface.

11. The carrier of claim 1 wherein the fluid release means comprises an orifice in the fluid cell which is sized to limit the rate at which fluid is released from the cell.

12. The carrier of claim 1 wherein the fluid cell comprises an air cell.

13. The carrier of claim 12 wherein the air cell has a generally pillow-shaped configuration including first and second sides, the first side having a depression formed therein.

14. A unit load carrier comprising first and second resilient cushions, each resilient cushion including first and second sides and an edge extending between the first and second sides, the first and second resilient cushions being disposed with the edges of the cushions facing each other; a base arrangement; mounting means for releasably mounting said base to the cushions, said cushions being in weight-bearing and supporting relationship to the base and unit load on the cushions while said cushions are mounted to the base through the mounting means; a collapsible fluid cell integral with each of said resilient cushions and not being in weight-bearing relationship to the base and unit load when the cushions are mounted to the base, said fluid cell being collapsible under at least a portion of the weight of the unit load and in a direction perpendicular to a foundation surface, and control means for controlling the rate at which fluid is released from the cell, said fluid cell being arranged so that upon release of said support means from weight-bearing relationship to said unit load a sufficient portion of the weight of said unit load is received by said fluid cell causing the control means to controllably release fluid from the fluid cell and to collapse said fluid cell sufficient to lower said unit load to the foundation surface, said fluid cell being capable of collapsing under the weight of said unit load sufficient to allow removal of the collapsed fluid cell from underneath said unit load when said load is at rest on the foundation surface.

15. The unit load carrier of claim 14 wherein the first side of each resilient cushion includes a supporting surface, wherein the base arrangement is disposed on the supporting surfaces, and wherein the fluid cells are mounted to the resilient cushions adjacent to the supporting surfaces.

16. The unit load carrier of claim 14 wherein the base arrangement includes a runner extending between the first and second resilient cushions.

17. The unit load carrier of claim 16 wherein the resilient cushion includes first and second ends extending between the first and second sides and a bracket extending from each end, and wherein the base arrangement includes a runner and threaded connectors for mounting the runner to the bracket.

18. The unit load carrier of claim 14 wherein each resilient cushion includes a stop for positioning the base arrangement on the cushion.

19. A method for manipulating a unit load comprising the steps of positioning the unit load on a foundation surface with a support disposed between the unit load and the foundation surface; transferring the weight of the unit load from the support onto a collapsible fluid cell integral with said support; and controlling the rate at which fluid is released from the cell to control the rate at which the unit load is lowered to the foundation surface.

20. The manipulating method of claim 19 further comprising releasably mounting the unit load to a base arrangement and releasably mounting the base arrangement to the support.

21. The manipulating method of claim 20 wherein transferring the weight of the unit load includes sliding the base arrangement off the support and onto the collapsible fluid cell.

22. The manipulating method of claim 21 wherein controlling the rate at which fluid is released includes providing an orifice in the fluid cell which is sized to release fluid from the cell at a controlled rate which lowers the unit load to the foundation surface.

* * * * *